J. T. HARRIS.
ELECTROLYTIC APPARATUS FOR PURIFYING LIQUIDS.
APPLICATION FILED NOV. 20, 1906.
900,926.
Patented Oct. 13, 1908.
3 SHEETS—SHEET 1.
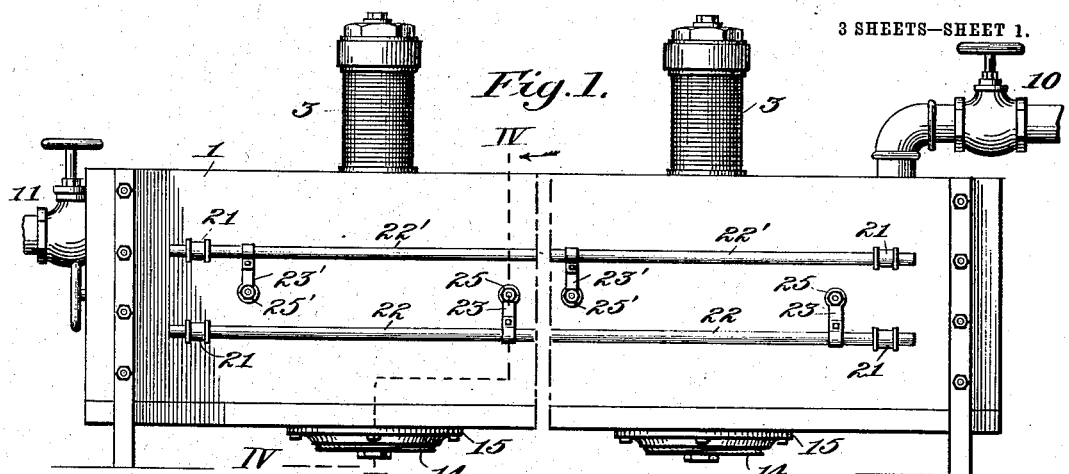
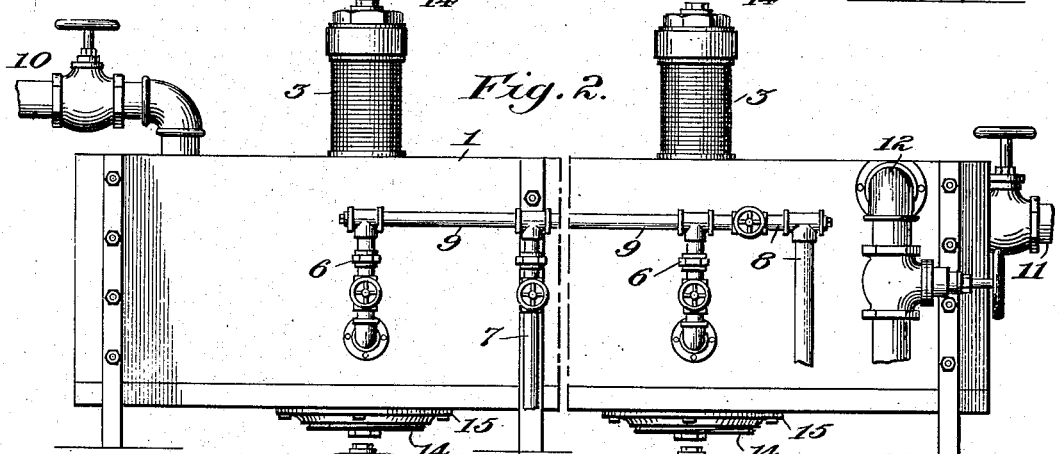
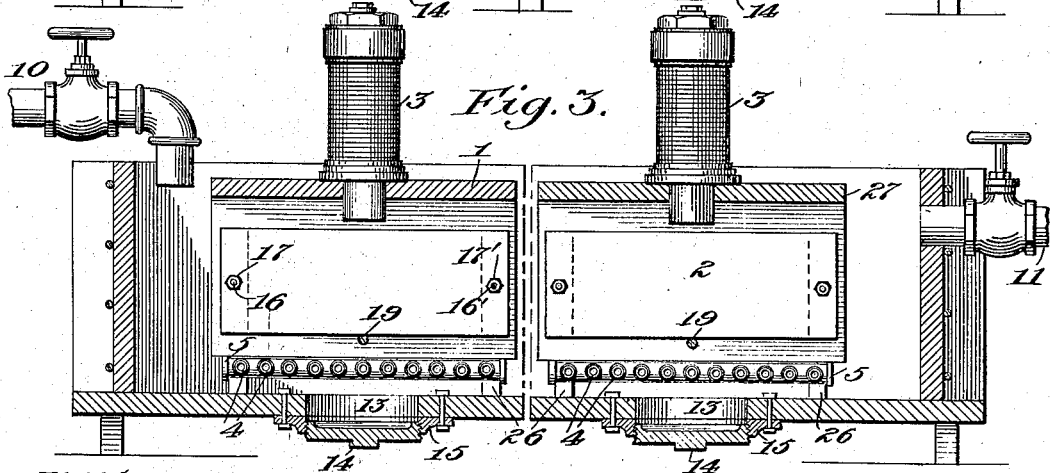
Witnesses:
Chas. H. Potter
E. G. Fullam
Inventor:
John T. Harris,
by Byrnes & Townsend
Att'ys.

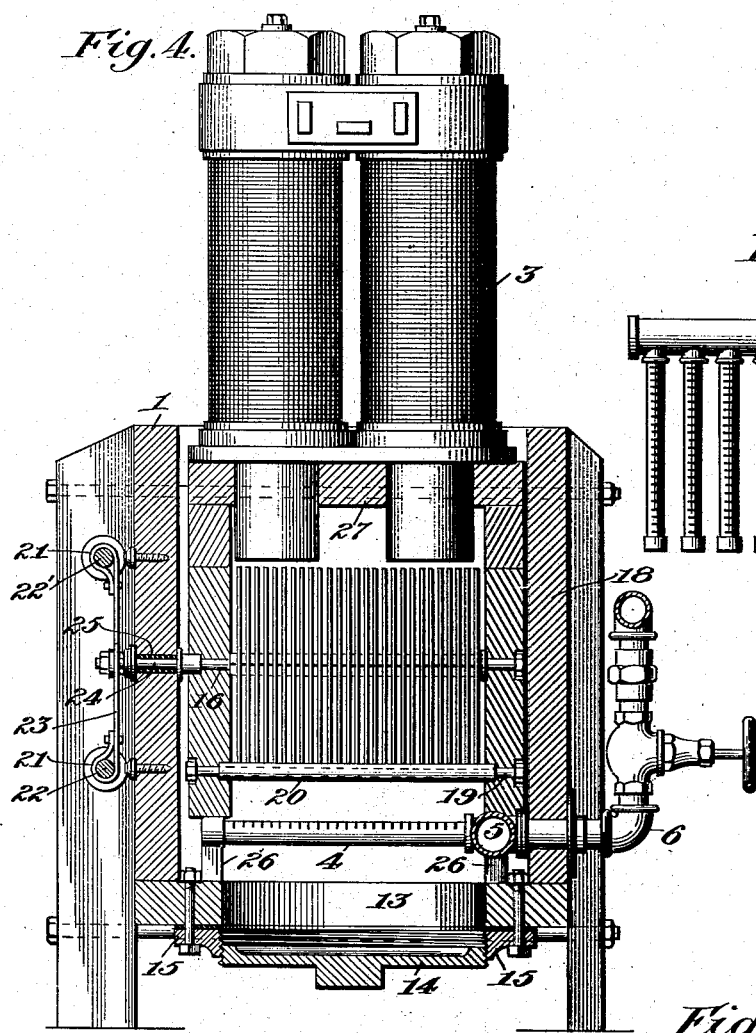
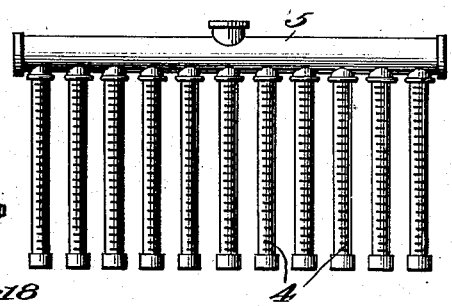
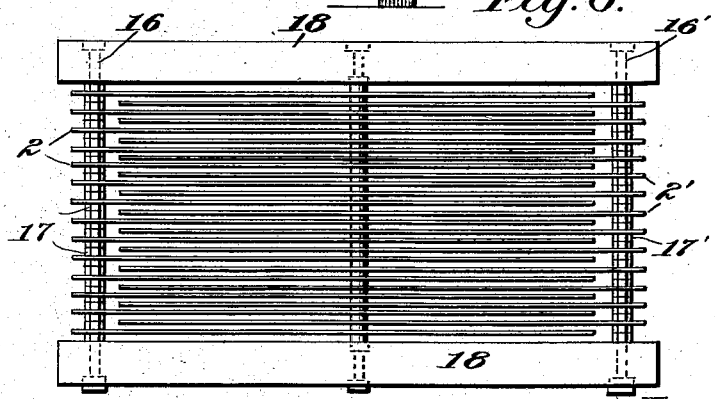

J. T. HARRIS.
ELECTROLYTIC APPARATUS FOR PURIFYING LIQUIDS.
APPLICATION FILED NOV. 20, 1906.
900,926.
Patented Oct. 13, 1908.
3 SHEETS—SHEET 3.
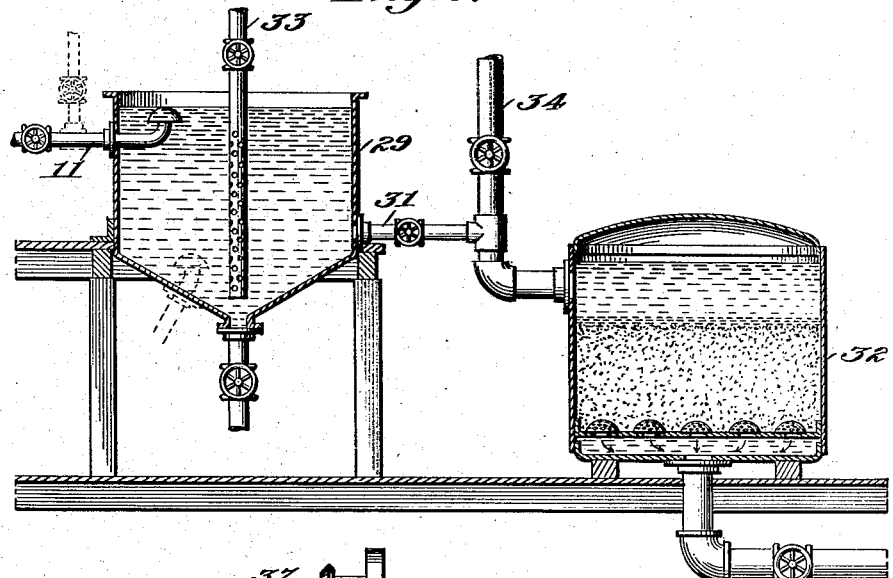
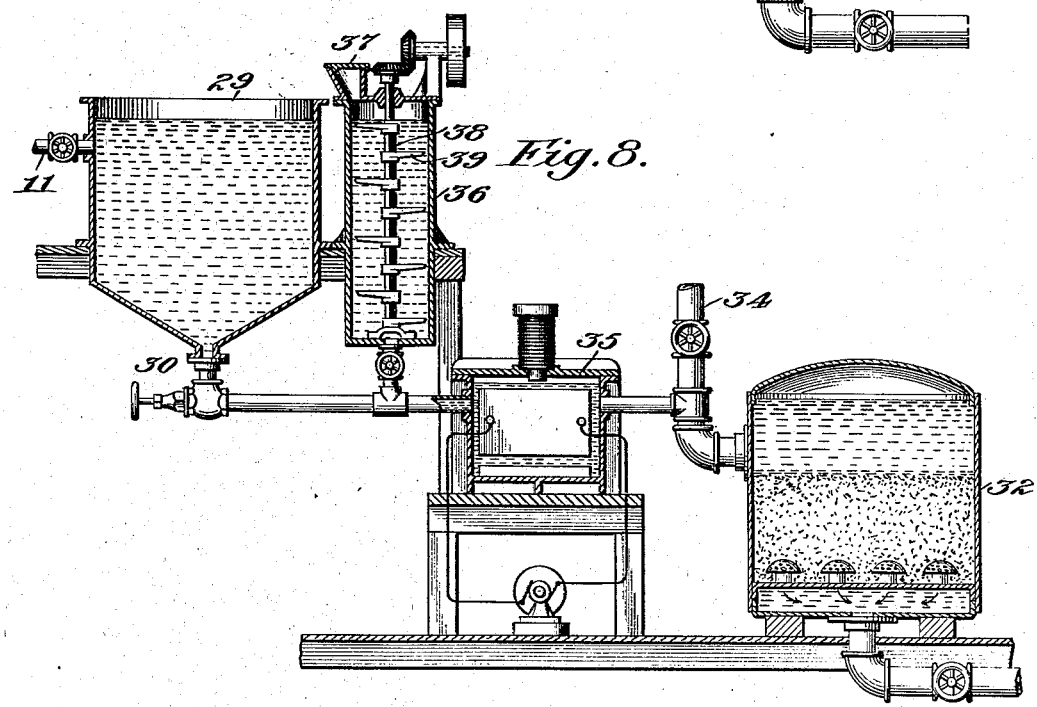
Witnesses:
Chas. H. Potter.
E. G. Fullam.
Inventor:
John T. Harris,
by Byrnes & Townsend
Att'ys.

UNITED STATES PATENT OFFICE.

JOHN T. HARRIS, OF NEW YORK, N. Y.

ELECTROLYTIC APPARATUS FOR PURIFYING LIQUIDS.

No. 900,926.     Specification of Letters Patent.     Patented Oct. 13, 1908.

Continuation of application Serial No. 162,406, filed June 20, 1903. This application filed November 20, 1906.
Serial No. 344,328.

*To all whom it may concern:*

Be it known that I, JOHN T. HARRIS, a citizen of the United States, residing at New York, in the county of New York and State of New York, have invented certain new and useful Improvements in Electrolytic Apparatus for Purifying Liquids, of which the following is a specification.

This apparatus is especially intended for the treatment of water, to remove impurities such as organic matter and mineral salts, and produce a perfectly clear, bright and palatable water, sterilized and free from color and odor.

The apparatus comprises means for passing an electric current through the water or other liquid to be purified, and for simultaneously subjecting the liquid to the action of a magnetic field. The anodes are preferably of a magnetic metal which will yield an insoluble, flocculent hydroxid, and specifically of iron. The magnetic field, acting upon the iron anodes and the liquid in contact with them, increases the volume of hydroxid produced by the electric current, with or without the production of an increased weight of the hydroxid. This hydroxid combines with and coagulates the organic matter in the water, and the coagulum is subsequently removed by sedimentation or filtration, or both. The water is preferably agitated and thoroughly aerated during treatment, by injecting upward through it streams of filtered air, which may be partially ozonized. In some cases, especially when the water contains free acid, coagulation and removal of the impurities is facilitated by the introduction of a suitable reagent, before, during or after the electrolytic treatment.

The process may be carried out by various forms of apparatus. One apparatus which has been found effective is shown in the accompanying drawings, in which:

Figure 1 is a side elevation of the electrolytic tank, the middle portion being broken out; Fig. 2 is a side elevation of the electrolytic tank viewed from the opposite side; Fig. 3 is a longitudinal, vertical section of the tank; Fig. 4 is a transverse, vertical section of the tank, on line IV—IV of Fig. 1; Fig. 5 is a plan view of a set of pipes for introducing air or steam into the tank; Fig. 6 is a plan view of one group of electrodes; Fig. 7 is a vertical section of a settling tank and filter; and Fig. 8 is a vertical section of a modified construction, employing a settling tank, a vessel for introducing a chemical agent, an electrolytic cell for retreating the water, and a filter.

The apparatus shown comprises a rectangular electrolytic tank 1, which may be of wood. Several groups of electrodes are arranged within the tank, in longitudinal series, the electrodes being parallel to the sides of the tank so that water introduced at one end of the tank may flow without obstruction between the electrodes of each group. An electromagnet 3 is supported above each group of electrodes, both poles of the magnet extending down into close proximity to the electrodes. Beneath each group of electrodes is a set of transverse perforated pipes 4, leading from a manifold 5. Valved pipes 6 pass through one side of the tank and one of these pipes is coupled to each manifold. A valved air pipe 7 and a valved steam pipe 8 deliver to a pipe 9, from which lead the several branch pipes 6. A valved pipe 10 delivers the water or other liquid to be treated to one end of the tank, and a valved pipe 11, at the other end of the tank, delivers the treated water to a settling tank or filter. A valved overflow pipe 12 leads from the delivery end of the tank, near its top. In the bottom of the tank, beneath each group of electrodes, is an opening 13, closed by a cover 14, which screws into a ring 15, bolted to the bottom of the tank. These openings serve for the removal of any precipitated iron, iron hydroxid or other solid matter which may collect at the bottom of the tank.

The electrodes are preferably thin, rectangular plates of wrought iron, although other metals may be employed. It is important that the electrodes should consist of a paramagnetic metal; also that the metal should be one which, when acted on by the electric current, will yield a coagulating agent. Iron perfectly satisfies these conditions, since it has the highest magnetic permeability, and is readily converted by the combined action of the electric current, magnetic field and injected air, into a voluminous, colloidal hydroxid, which combines with every particle of organic matter in the water, producing a coagulum which can be easily settled out or removed by filtration. Each group of electrodes shown comprises fourteen anodes, 2, and thirteen cathodes, 2', arranged in alternation. The end of each anode is perforated and projects beyond the end of the group of electrodes. A threaded iron rod 16 passes through the apertured end of each anode and is clamped in good electrical contact with the anodes by nuts 17, two of these nuts lying between and serving to space adjacent anodes and one nut being outside each outermost anode. The ends of the rod 16 pass through openings in vertical wooden plates 18, arranged at the sides of the group of electrodes. The rod 16 thus serves both as an electric conductor and a support for one end of the anodes. The ends of the cathodes, 2', are also perforated and extend beyond the end of the group of electrodes. A threaded iron rod 16'' extends through and is clamped to the ends of the cathodes by nuts 17'. Rod 16' passes through the wooden plates 18 and serves as a negative conductor for the cathodes. Beneath the middle portion of each group of electrodes is a transverse iron rod 19, which extends through and is clamped to the wooden plates 18. Upon this rod is an insulating sleeve 20, preferably of hard rubber, which serves as a support for both anodes and cathodes. Upon one side of the tank are secured two superposed sets of insulators, 21, the insulators of each set being in alinement. (See Fig. 1). Copper rods 22 and 22' are supported in two sets of insulators, respectively, the lower rod 22 being coupled to the positive terminal of a dynamo or other source of electric current and the upper rod 22' being coupled to the negative terminal of the dynamo. Copper straps 23, have their lower ends bent around and soldered to the rod 22. The upper end of each of these straps is perforated and bolted to a copper pin 24, which passes through an insulating bushing 25 in the side of the tank and is coupled to an end of the iron rod 16. Similar straps 23' are secured to the upper rod 22' and each bolted to a pin 25' which is coupled to an iron rod 18'. The side plates 18 rest upon pipes 4 and manifold 5, which, in turn, are supported by blocks 26 on the bottom of the tank. Each electromagnet, 3, is removably supported above the corresponding group of electrodes by a wooden frame 27, resting directly upon the side plates 18. It will be seen that each group of electrodes, with its side plates, 18, is a compact unit, which can be removed from the tank when the terminal pins 25, 25', are uncoupled.

Referring now to Fig. 7: The outlet pipe 11 of the electrolytic tank delivers the treated water, with the coagulum in suspension, into the settling vessel 29. By leaving the water in this tank for a sufficient period, the impurities may be entirely settled out and withdrawn from the bottom of the vessel through valved outlet 30. On account of the time required for the subsidence of the coagulum, it is preferable to withdraw the water, when partially purified, through a valved pipe 31 and to pass it through the filter 32. While the water is still in the settling vessel 29, it may be carbonated, ozonized, etc., by a stream of gas introduced through a perforated pipe 33. In some cases, the water may be delivered through a by-pass, not shown, to a pipe 34, leading directly into the filter.

Fig. 8 shows a modified construction in which a second electrolytic tank 35 is interposed between the settling vessel 29 and the filter 32. A second treatment of the water is, however, rarely necessary. A vessel 36 is shown coupled to a pipe 31, between the settling vessel and the second electrolytic tank. This vessel serves for the preparation and introduction of a reagent, such as lime water, or milk of lime, which is desirable in the treatment of water containing acid impurities. This vessel has a hopper 37 for introducing the reagent and a vertical revolving stirrer 38 with radial arms 39, for thoroughly intermingling the reagent and the water or other solvent.

In employing the described apparatus, the tank is first filled with the liquid to be purified and a full stream of the liquid is thereafter passed into, through and out of the tank, the length of the tank and the number of electrodes and electromagnets being suitably proportioned to the size of the inlet and discharge pipes. It has been found that ten groups of electrodes, each comprising fifteen anodes and fourteen cathodes, in a tank having a capacity of 3000 gallons, are sufficient for the treatment of the amount of water carried through the tank by inlet and outlet pipes having an inside diameter of three inches, the water being supplied at the pressure usual in city mains. As the water flows between the electrodes, it is traversed by the electric current, about thirty amperes at a pressure of from seven to ten volts being usually supplied to each group of electrodes. The electromagnets, which are preferably connected in series, are simultaneously energized, usually by a current of from eight to ten amperes. The current supplied to the electrodes and electromagnets is usually direct, but may be alternating, especially if both electrodes are of iron. Air, which is usually filtered and which may be partially ozonized, is injected through the perforated pipes during the treatment, usually at a pressure of five pounds to a square inch.

The chemical reactions effected by the joint action of the electrolyzing current, magnetic field and injected air, are complicated and dependent on the liquid treated and the impurities contained therein. For the purpose of illustration, a statement is given of some of the reactions which are thought to take place in the treatment of water such as is supplied by the distributing mains in the city of New York. This water will be assumed to contain carbonates and sulfates of calcium and magnesium, alkali chlorids, organic matter and bacteria. The anions of the water and mineral salts therein partly combine with the iron of the anodes, producing iron hydroxids, chlorids, carbonates and sulfates. The iron salts so produced are then largely hydrolyzed, giving a further amount of hydroxid. The injected air also facilitates or increases the yield of hydroxids. Some of the electrolytic oxygen, or ozone, and chlorin react upon and decompose the albuminoids and other organic matter. The hydrogen liberated at the cathode, distributed throughout the water by the vigorous agitation due to the injected air, attaches itself in minute bubbles to the particles of iron hydroxid, thus making it of looser texture and more flocculent, and assisting to maintain it in suspension until it has had time to fully coagulate all of the organic matter.

The alkali and alkali metal hydroxids formed at the cathodes decompose the bicarbonates in solution, precipitating them as normal carbonates. These hydroxids also react on the iron salts to produce iron hydroxids, and combine with some of the chlorin from the anodes to produce hypochlorites, which decompose the organic matter and sterilize and decolorize the water. The strong magnetic field within which the treatment is effected, rendering the electrodes highly magnetic, notably increases the volume of hydroxid produced by the electric current and the injected air. This increased volume is thought to be largely due to some physical differences, such as an increase of the porosity or flocculent character. Repeated tests under otherwise identical conditions and upon the same water have shown this increase in the volume of the coagulant, and a more effective purification of the water. When the water contains notable quantities of sulfates or free sulfuric acid, as is the case with many river waters which receive factory wastes, some of the iron sulfates produced in the apparatus remains in solution and passes on to the settling tank and filter. In such event, lime water, milk of lime, or a very dilute solution of caustic soda, is introduced into the water, preferably after treatment and before the coagulum is separated. The iron is thereby precipitated, while the sulfuric acid combines with the lime, also precipitating it.

It is desirable to clean the electrodes occasionally, to remove any adherent slime. This may be easily effected by placing a long rubber blanket upon the electrodes, filling the tank with water, and injecting steam at a pressure of about 50 pounds per square inch through the perforated pipes for a few minutes. The water outlet and inlet pipes are then opened and a full current of water flushes out the foreign matter. In continuous operation, the heavy sediment which accumulates in the tank should be removed through the bottom outlets about once a month.

When the apparatus is not in use over night, it is desirable, upon starting it in operation, to first fill the tank with water and pass the full electric current, with injection of air, for five minutes; then to flush out the tank with a full stream of water.

The top of the tank is here shown open but it may be closed, so as to work under pressure. A continuous injection of air during the operation will often be found unnecessary, but is desirable, both on account of the chemical action and the thorough agitation effected by it. By the use of sufficient current, the water treated in the tank may be so heavily charged with the iron coagulent as to be a suitable reagent for the treatment of larger bodies of water, such as those in distributing tanks and reservoirs.

The water produced by this process is clear, bright, colorless, odorless and sterile, so that it is desirable for drinking. The cost of treating it is so small that it can be also used to advantage in steam boilers and for general purposes. The process carried out by the use of this apparatus constitutes the subject matter of my United States Letters Patent, No. 857,277, dated June 18, 1907. This application is a continuation of my abandoned application, Ser. No. 162,406, filed June 20, 1903.

I claim:

1. An electrolytic apparatus for purifying liquids, comprising a vessel, a magnetized anode of a material which will yield a coagulant, a cathode, and means for separating the impurities from the treated liquid, as set forth.

2. An electrolytic apparatus for purifying liquids, comprising a magnetized anode of a material which will yield a coagulant, a cathode, means for passing a stream of the impure liquid past the electrodes, and means for separating the impurities from the treated liquid, as set forth.

3. An electrolytic apparatus for purifying liquids, comprising a series of electrodes of a material which will yield a coagulant, means for passing a stream of the impure liquid between the electrodes, means for subjecting the electrodes and moving liquid to a magnetic field, and means for separating the impurities from the treated liquid, as set forth.

4. An electrolytic apparatus for purifying liquids, comprising a vessel, a magnetized anode of a material which will yield a coagulant, a cathode, means for injecting a gas into the liquid, and means for separating the impurities from the treated liquid, as set forth.

5. An electrolytic apparatus for purifying liquids, comprising a magnetized anode of a material which will yield a coagulant, a cathode, means for passing a stream of the impure liquid past the electrodes, means for injecting a gas into the liquid, and means for separating the impurities from the treated liquid, as set forth.

6. An electrolytic apparatus for purifying liquids, comprising a series of electrodes of a magnetizable material which will yield a coagulant, means for passing a stream of the impure liquid between the electrodes, means for subjecting the electrodes and moving liquid to a magnetic field, means for injecting a gas into the liquid, and means for separating the impurities from the treated liquid, as set forth.

7. An electrolytic apparatus for purifying liquids, comprising a vessel, electrodes, the anode or anodes consisting of a magnetizable metal which will yield a coagulant, means for subjecting the anode and liquid to the action of a magnetic field, and means for separating the coagulated impurities from the treated liquid, as set forth.

8. An electrolytic apparatus for purifying liquids, comprising a vessel, a magnetized iron anode, a cathode, and means for separating the coagulated impurities from the treated liquid, as set forth.

9. An electrolytic apparatus for purifying liquids, comprising a series of electrodes, the anodes being of magnetized iron, means for passing a stream of the impure liquid between the electrodes, and means for separating the coagulated impurities from the treated liquid, as set forth.

10. An electrolytic apparatus for purifying liquids, comprising a vessel, electrodes, the anode or anodes consisting of a magnetizable metal which will yield a coagulant, means for subjecting the anode and liquid to the action of a magnetic field, means for injecting a gas into the liquid, and means for separating the coagulated impurities from the treated liquid, as set forth.

11. An electrolytic apparatus for purifying liquids, comprising a vessel, a magnetized iron anode, a cathode, means for injecting a gas into the liquid, and means for separating the coagulated impurities from the treated liquid, as set forth.

12. An electrolytic apparatus for purifying liquids, comprising a series of electrodes, the anodes being of magnetized iron, means for passing a stream of the impure liquid between the electrodes, means for injecting a gas into the liquid, and means for separating the coagulated impurities from the treated liquid, as set forth.

13. An electrolytic apparatus for purifying liquids, comprising a vessel, electrodes, the anode or anodes consisting of a magnetizable metal which will yield a coagulant, means for subjecting the anode and liquid to the action of a magnetic field, a source of compressed air, a source of steam, means for injecting said air or steam into the liquid, and means for separating the coagulated impurities from the treated liquid, as set forth.

14. An electrolytic apparatus for purifying liquids, comprising a series of electrodes, the anodes being magnetized iron, means for passing a stream of the impure liquid between the electrodes, a source of compressed air, a source of steam, means for injecting said air or steam into the liquid, and means for separating the coagulated impurities from the treated liquid, as set forth.

15. An electrolytic apparatus for purifying liquids, comprising a vessel, a group of anodes and cathodes arranged in alternation, the anodes consisting of a magnetizable material which will yield a coagulant, a magnet having a pole-piece in proximity to the electrodes, and a set of perforated pipes adjacent to the electrodes, as set forth.

16. An electrolytic apparatus for purifying liquids, comprising a vessel, a group of anodes and cathodes arranged in alternation, the anodes consisting of a magnetizable material which will yield a coagulant, a magnet having a pole-piece in proximity to the electrodes, a set of perforated pipes adjacent to the electrodes, and an outlet through the bottom of the vessel beneath the electrodes, as set forth.

17. An electrolytic apparatus for purifying liquids, comprising a long vessel having an inlet and an outlet at its ends, a series of groups of electrodes within and parallel to the side of the vessel, the anodes consisting of a magnetizable material which will yield a coagulant, and a series of magnets having their pole-pieces in proximity to the several groups of electrodes, as set forth.

18. An electrolytic apparatus for purifying liquids, comprising a long vessel having an inlet and an outlet at its ends, and a series of groups of electrodes arranged in said vessel, each group being a removable unit and the anodes consisting of a magnetized material which will yield a coagulant, as set forth.

19. An electrolytic apparatus for purifying liquids, comprising a long vessel having an outlet and an inlet at its ends, a series of groups of electrodes within and parallel to the sides of the vessel, the anodes consisting of a magnetized material which will yield a coagulant, and a set of perforated pipes beneath each group, as set forth.

20. An electrolytic apparatus for purifying liquids, comprising a long vessel having an inlet and an outlet at its ends, a series of groups of electrodes in the vessel, the anodes consisting of a magnetizable material which will yield a coagulant, a series of magnets having pole-pieces in proximity to the several groups, and a set of perforated pipes beneath each group, as set forth.

21. An electrolytic apparatus for purifying liquids, comprising an electrolytic cell having an inlet and an outlet, a magnetized anode or anodes which will yield a coagulant, a settling tank connected to said cell, and a filter connected to said tank, as set forth.

22. An electrolytic apparatus for purifying liquids, comprising an electrolytic cell having an inlet and an outlet, a magnetized anode or anodes which will yield a coagulant, means for separating the coagulated impurities from the treated liquid, and means for introducing a supplemental reagent into the treated liquid, before the coagulum is separated, as set forth.

23. An electrolytic apparatus for purifying liquids, comprising an electrolytic cell having an inlet and an outlet, an anode or anodes which will yield a coagulant, a settling tank connected to said cell, a filter connected to said tank, and a vessel containing a stirrer and having connection for introducing a supplemental reagent into the treated liquid after it leaves the settling tank and before it enters the filter, as set forth.

In testimony whereof, I affix my signature in presence of two witnesses.

JOHN T. HARRIS.

Witnesses:
ANTONIO RASINÉS,
GEO. D. PHILLIPS.